United States Patent [19]
Duke

[11] Patent Number: 5,324,001
[45] Date of Patent: Jun. 28, 1994

[54] SEWER TRANSFER SYSTEM

[76] Inventor: Robert L. Duke, 4175 Woodsmen Way, Winston-Salem, N.C. 27103

[21] Appl. No.: 144,565

[22] Filed: Nov. 2, 1993

Related U.S. Application Data

[63] Continuation-in-part of Ser. No. 994,510, Dec. 21, 1992, abandoned.

[51] Int. Cl.⁵ .................................................. F16K 51/00
[52] U.S. Cl. ........................................ 251/147; 251/148; 285/236; 285/179; 277/147; 277/207 A
[58] Field of Search ............... 251/148, 147; 285/302, 285/179, 236, 901; 277/147, 207 A

[56] References Cited

U.S. PATENT DOCUMENTS

| | | | |
|---|---|---|---|
| 3,949,787 | 4/1976 | Milo | 138/89 |
| 4,036,513 | 7/1977 | Loftus et al. | 285/179 |
| 4,059,293 | 11/1977 | Sipler | 285/236 |
| 4,133,347 | 1/1979 | Mercer | 137/344 |
| 4,365,829 | 12/1982 | Fowler | 285/162 |
| 4,461,498 | 7/1984 | Kunsman | 285/16 |
| 4,554,949 | 11/1985 | Sell | 137/899 |
| 4,650,224 | 3/1987 | Smith | 285/165 |
| 4,660,860 | 4/1987 | Todd | 285/12 |
| 4,708,370 | 11/1987 | Todd | 285/12 |
| 4,722,556 | 2/1988 | Todd | 285/12 |
| 4,779,650 | 10/1988 | Sargent et al. | 137/899 |
| 4,796,520 | 1/1989 | Kramer, Jr. | 98/115 |
| 4,817,991 | 4/1989 | Frentzel et al. | 285/7 |
| 4,844,121 | 7/1989 | Duke | 137/615 |
| 4,854,349 | 8/1989 | Foreman | 138/89 |
| 4,865,357 | 9/1989 | Brinegar | 285/55 |
| 5,150,926 | 9/1992 | Egli | 277/207 A |

Primary Examiner—Martin P. Schwadron
Assistant Examiner—Kevin L. Lee

[57] ABSTRACT

A sewage transfer system connecting the sewer outlet of a recreational vehicle to a remote sewer collection inlet that include a primary sewer line to connect the vehicle sewer outlet; an L-shape rigid pipe associated with the primary sewer line; and a hub, washer and clamping device to connect the L-shaped rigid pipe in a gas-tight and water-tight connection to the sewer inlet.

17 Claims, 3 Drawing Sheets

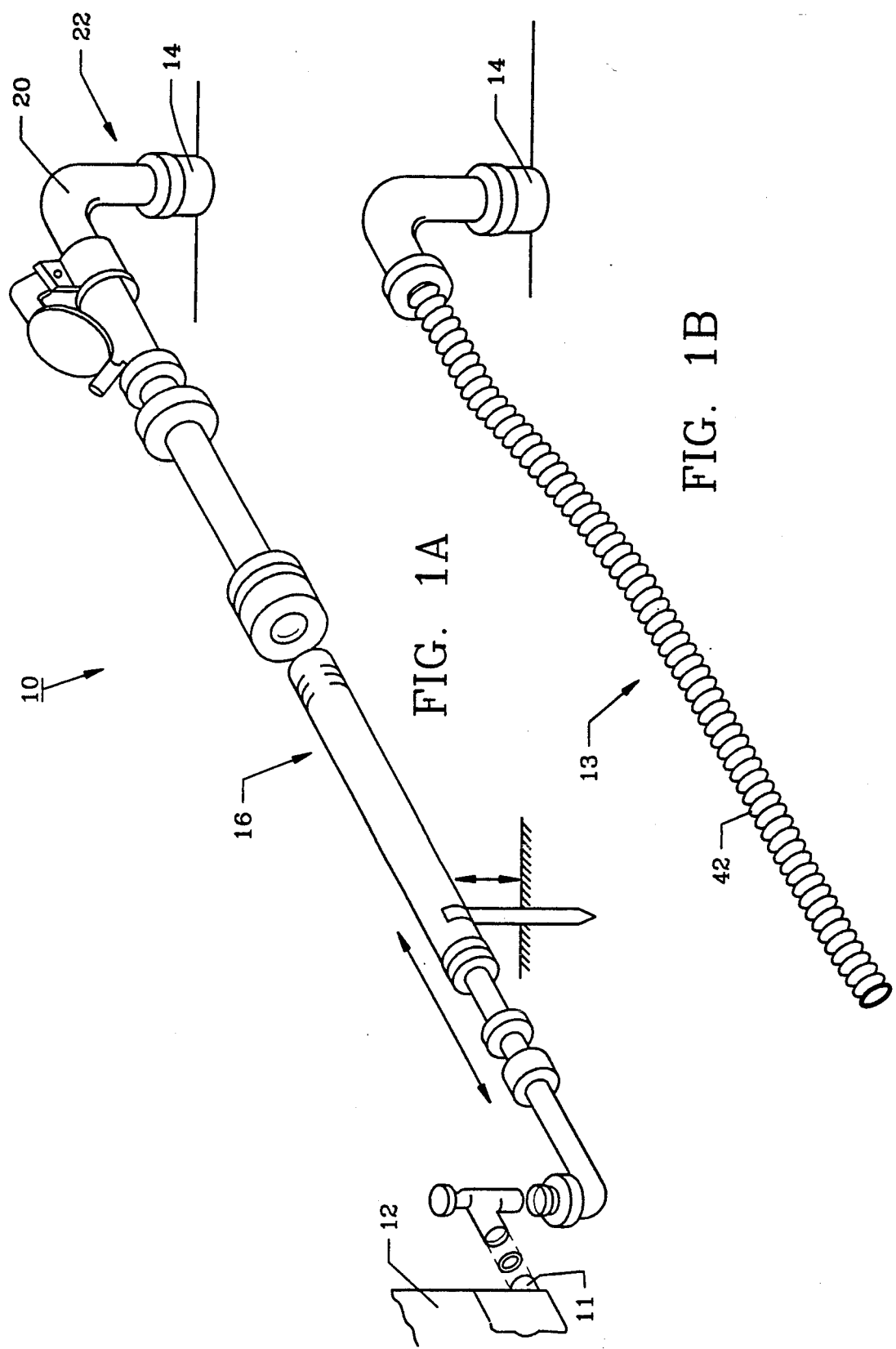

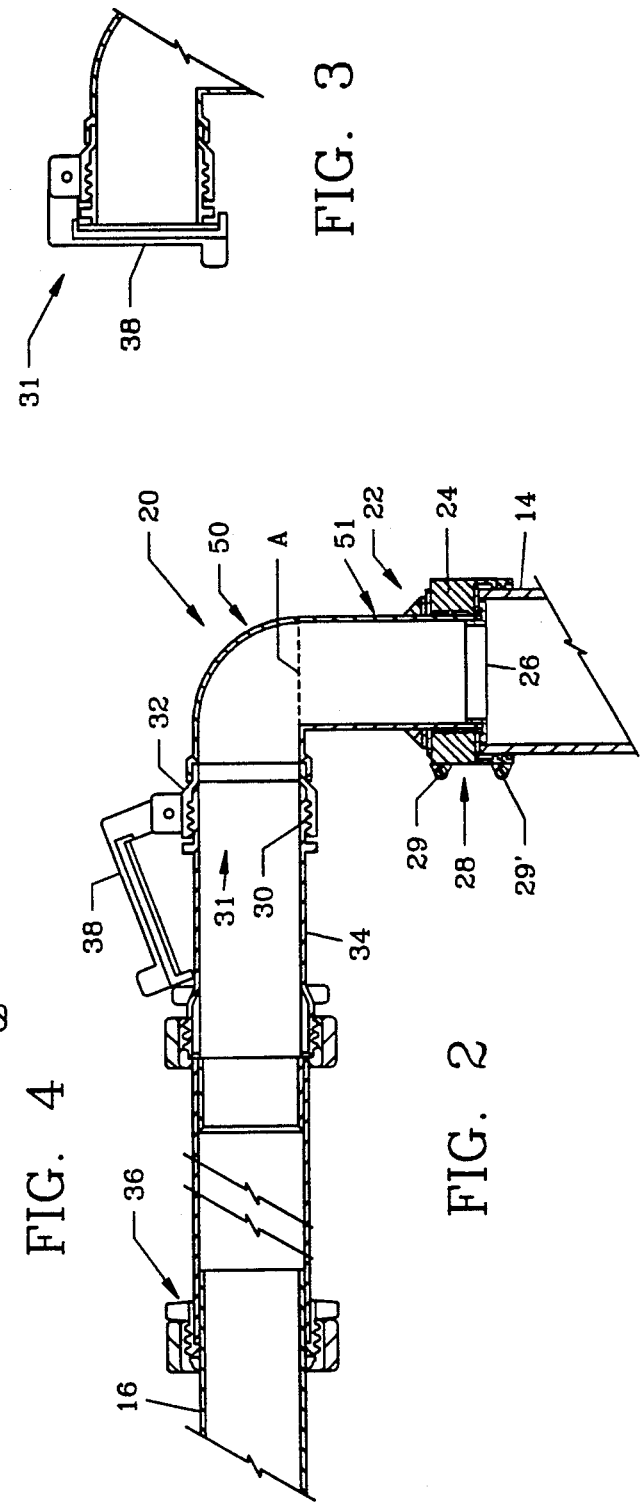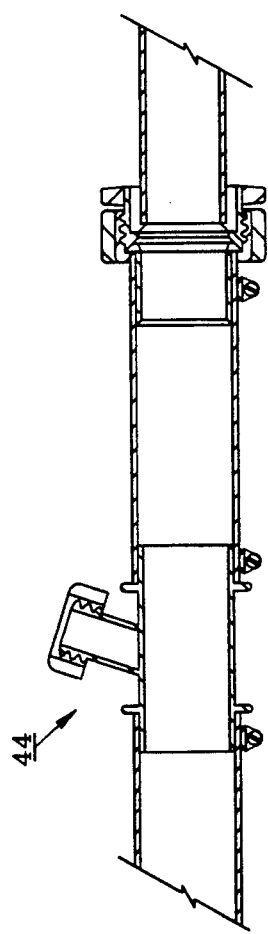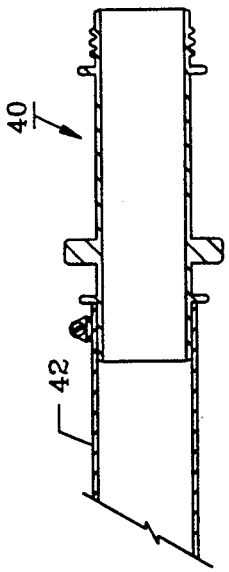

SEWER TRANSFER SYSTEM

This application is a continuation-in-part of pending application Ser. No. 07/994,510 filed 21 Dec. 1992, now abandoned.

BACKGROUND OF THE INVENTION

1. Field of the Invention

The present invention relates to the field of sewage draining devices and more particularly to a sewage draining system for recreational vehicles or the like.

2. Description of the Prior Art and Objectives of the Invention

To facilitate maximum use of recreational vehicles at a camp site, it is desirable to quickly and efficiently connect the sewer outlet of the vehicle to the sewer inlet provided by the camp site. The manufacturers of recreational vehicles usually provide a flexible sewage drain pipe for this purpose which is usually formed of a coil spring embedded within a plastic casing much like the tubing used for dryer exhaust. While it offers strength and flexibility needed for typical camping use, it is relatively loose and conforms to the ground surface which in many cases varies so as to cause pools to form within the drain pipe.

Generally, standard plumbing and health ordinances and regulations governing recreational vehicles require park owners to provide a park draining system connected to a public or private sewage disposal system with park site sewer connections that have sewer inlets with four-inch diameters that extend three to six inches above grade. Each such inlet must have a gas-tight seal when connected to the recreational vehicle or a gas-tight seal plug when the vehicle is not connected. Drain connections with recreational vehicles must have a smooth surface and be not less than three inches in diameter, slope continuously downward and form no traps, and joints and connections that can be maintained in a gas-tight and water-tight condition.

Various types of sewer systems for recreational vehicles are known, and the most closely conforming to these requirements is reflected in U.S. Pat. No. 4,844,121. While various arrangements are provided to fit sewer inlets of varying diameters, no water-tight or gas-tight sealable connection is contemplated by this disclosure.

Consequently, it is desirable to provide a new and improved sewer transfer system for achieving a gas-tight and water-tight sealable connection from the recreational vehicle sewer outlet to the sewer inlet. Moreover, it is a certainty that existing regulations will be more vigorously enforced to require such devices in the immediate future. With the foregoing in mind, the present invention has been developed.

SUMMARY OF THE INVENTION

It is therefore the principal object of the present invention to provide a new and improved sewage transfer system for removing sewage from the sewer outlet of a recreational vehicle to a remote sewer inlet that has all of the advantages of prior art devices and none of the disadvantages.

A further object of the present invention is to provide a sewage transfer system which provides a gas-tight and water-tight sealable connection from the recreational vehicle sewer outlet to the park site sewer inlet.

It is a further object of the present invention to provide a new and improved sewage transfer system which is easy and convenient to install, and disassemble, while providing operational advantages heretofore unachieved.

It is yet still another object of the present invention to provide a sewage transfer system compatible with existing systems provided by recreational vehicle manufacturers or usable with newly developed components emphasizing additional efficiencies.

The present invention includes an L-shaped rigid pipe connected at one end to the park site sewer inlet in a connection which enables rotation of the L-shaped pipe relative to the sewer inlet and which is gas-tight and water-tight. The connection is made using a conventional neoprene hub band and sleeve secured by a conventional hub band clamp with nylon washers. The L-shaped pipe is internally threaded at its opposing end to receive the externally threaded end segment connected to the primary sewer line extending from the recreational vehicle sewer outlet.

A cap pivoted at the threaded end of the L-shaped pipe provided with a gasket and has a spring assembly urging the cap to closed position when the externally threaded segment is not connected to the L-shaped pipe. The externally threaded segment is also externally threaded at its opposing end and is connectable to the primary sewer line by an arrangement of a flanged sleeve and an internally threaded nut.

Thus, there has been outlined the more important features the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining one embodiment of the invention in detail, it is to be understood that the invention not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, together with other objects of the invention, along with the various features of novelty which characterize the invention, are pointed out with particularity in the claims and this disclosure. For better understanding of the invention, its operating advantages and the specific objects attained by its uses, reference should be made to the following detailed description and the accompanying drawings in which like characters of reference designate like parts throughout the several views.

BRIEF DESCRIPTION OF THE DRAWINGS

FIG. 1A is a perspective view of the sewage transfer system comprising the present invention with a rigid, telescoping sewer line extending from the sewer outlet of a recreational vehicle to a remote sewer connection inlet;

Fig. 1B is a perspective view of the invention in use with conventional sewer line;

FIG. 2 is a side elevational, fragmentary and sectional view of the L-shaped rigid pipe associated with the primary sewer line and connected to the sewer outlet;

FIG. 3 is a side elevational, fragmentary and sectional view of the pivotally mounted cap on the L-shaped member in the closed condition;

FIG. 4 is an alternative connector for joining the L-shaped member to a conventional plastic threaded primary sewer line extending from the sewer outlet of a recreational vehicle;

FIG. 5 is a side elevational, fragmentary and sectional view of the primary sewer line of a sewage transfer system which includes an inlet for washing the interior of the primary sewer line;

DETAILED DESCRIPTION OF THE DRAWINGS AND OPERATION OF THE INVENTION

Figure 7:
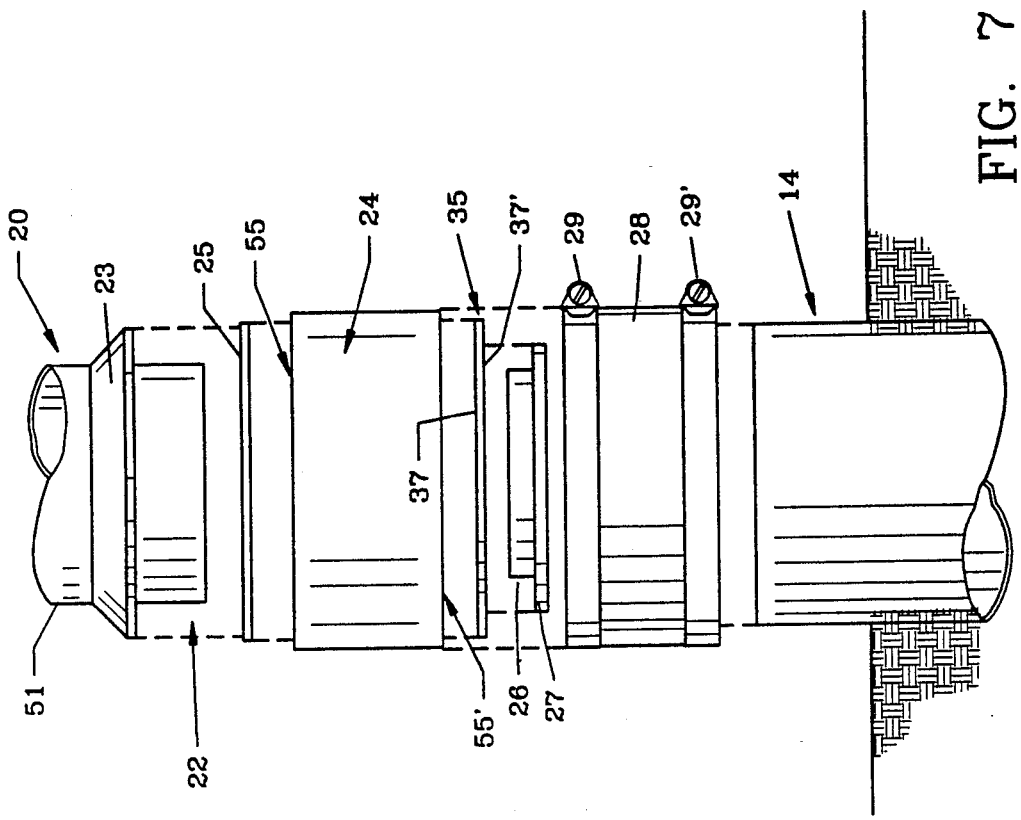
FIG. 7 is an exploded view of the preferred components generally seen in FIG. 6.

Referring now the drawing, but particularly to FIG. 1A, a sewage transfer system shown generally as 10 connecting sewer outlet 11 of recreational vehicle 12 to remote sewer collection inlet 14 includes a primary sewer line 16 to which is connected the principal components of the present inventive concept. The system shown in FIG. 1A includes a telescoping sewer line 16 which is the subject of earlier U.S. Pat. No. 4,844,121 and which can be used in conjunction with the present invention. Alternatively, the present invention can be used with a conventional primary sewer line 13 as shown in FIG. 1B usually formed of a coil spring embedded within plastic casing 42 much like the tubing used for dryer exhaust systems.

An L-shaped rigid pipe shown generally as 20 in FIG. 2 is connected at one end 22 to the part sewer inlet 14 in a connection utilizing a conventional neoprene hub band 24 as is standard in the trade and sleeve 26 rigidly affixed such as with an adhesive within end 22 of pipe 20 and secured by conventional hub band clamp 28. Pipe 20 is internally threaded at connector 32 to receive an externally threaded end of segment 34 which is in turn on its other end 36 secured to the primary sewer line, in FIG. 2 a telescoping sewer line 16 such as shown in FIG. 1.

When section 34 is removed, a pivotally mounted cap 38 closes end 31 of pipe 20 as illustrated in FIG. 3. This provides the obvious benefit of minimizing odor and preventing the collection of trash sewer inlet 14.

An alternative section 40 is shown in FIG. 4 which can be connectable to the conventional coil spring embedded plastic casing 42 usually provided with recreational vehicles when they are sold. Section 40 provides an alternative system should a telescopic system like shown in FIG. 1A not be used and the conventional casing 42 seen in FIG. 1B utilized.

A wash insert 44 is shown in FIG. 5 and provides a mechanism for flushing out the sewer line from time to time and avoiding odors that might develop from frequent use. With respect to the present invention, it is to be realized that the techniques involved forming a novel combination set forth herein and the components associated herewith are unlimited and are deemed readily apparent and obvious to one skilled in the art. All equivalent relationships to those as illustrated in he drawings as described in the specification are intended to be encompassed herein.

Figure 6:
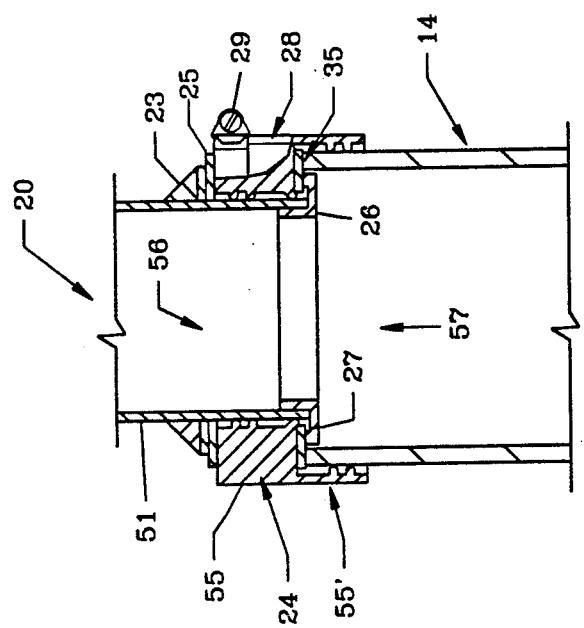
FIG. 6 is an enlarged fragmented cross sectional assembled view of the preferred connection of the L-shaped rigid pipe to sewer inlet.

To better understand the preferred connection with sewer inlet 14, FIG. 6 demonstrates a cross sectional elevational view and provides an exploded view. L-shaped rigid pipe 20 includes an upper horizontal section 50 as divided by imaginary line A in FIG. 2. While rigid pipe 20 is L-shaped, various other pipe configurations could be utilized with equivalent .convenience. Flange 23 is rigidly affixed or integrally molded with section 51 as shown in FIG. 6 with washer 25 positioned thereagainst. Washer 25 sits atop hub band 24 which is adjustably tightenable against sewer inlet 14 and lower vertical section 51 of rigid pipe 20. Hub band clamp 28 is a conventional metal clamp having threaded members 29, 29' which tighten for a stronger gripping force. Hub band clamp 28 is shown fragmented in FIG. 6 to better illustrate its position on hub band 24.

Terminal end 22 of lower vertical section 51 of rigid L-shaped pipe 20 is seen in FIG. 7 and sleeve 26 therewithin is seen in FIG. 6. Sleeve 26 is glued or inwardly molded within end 22 and sleeve 26 comprises end flange 27. As seen in FIG. 6, end flange 27 extends radially outwardly and washer 35 extends radially outwardly beyond end flange 27, but within lower end 55' of hub band 24 to engage sewer inlet 14. A second washer 35 has a top flat surface 37 and a bottom flat surface 37' is shown in FIG. 7. As also shown in FIG. cylinder-shaped hub band 24 has an upper end 55 and a lower end of 55'. Upper end 55 defines a relatively small axial opening 56 for receiving lower section 51 of rigid pipe 20 and lower end 55' defines a relatively large axial opening 57 as shown in FIG. 6 for receiving) sewer inlet 14. As further seen, small axial opening 56 is in alingment with large axial opening 57 to provide fluid communication therethrough.

Second washer 35 as seen in FIG. 6 is positioned inside axial opening 57 with its upper surface 37 abutting the bottom of upper end 55 of hub band 24 and with bottom surface 37' resting on end flange 27 and in slidable engagement therewith. Thus, when hub band clamp 28 is loosened by rotating threaded members 29, 29', L-shaped rigid pipe 20 is rotatable as flange 23 slides on first washer 25 and sleeve 26 (through end flange 27) slides on second washer 35 to the desired position. Hence, the connection to inlet 14 can be easily varied by rotation and maintained in a sealed condition by retightening members 29, 29' by relatively unskilled personnel.

Thus the following is considered as illustrative only of the principals of the invention. Since numerous modifications and changes will readily occur to those skilled in the art, it is not desired to limit the invention to he exact instruction and operation shown and described. All suitable modifications and equivalents falling within the scope of the depended claims are deemed within the present inventive concept.

The illustrations and examples provided herein are for explanatory purposes and are not intended to limit the scope of appended claims.

I claim:

1. A system for joining a primary sewage line of recreational vehicle to a sewer inlet comprising: a rigid pipe, said pipe having first and second sections, said first section for releasable attachment to said primary sewage line, said second section for rotational attachment to said sewer inlet, said second section having a terminal end, an end flange, said end flange positioned on the terminal end of said second section, a first washer, said first washer having top and bottom surfaces, said first washer slidably affixed around said second section with said bottom surface in contact with said end flange, a resilient cylindrically shaped hub band, said cylindrically shaped hub band having an upper end and a lower end, said upper end defining a small axial opening, said lower end defining a large axial opening, said small axial opening aligned with and in fluid communication with said large axial opening, said second section positioned within said small axial opening, said first washer positioned within said large axial opening of said hub band, said hub band extending axially beyond said terminal end of said second section for receiving said sewer inlet therewithin, means to adjustably clamp said hub band to said rigid pipe and to said sewer inlet, said clamping means positioned around said hub band whereby said sewer inlet inlet is receivable within said large axial opening against said bottom surface of said first washer to thereby seal said sewer inlet to said rigid pipe and to allow rotation of said rigid pipe relative to said sewer inlet when said clamping means is loosely adjusted.

2. The system of claim 1 wherein said rigid pipe is L-shaped.

3. The system of claim 2 and including a biased means close said first section , said biased closing means attached to said first section.

4. The system of claim 3 wherein is biased sealing means is pivotally affixed to said first section.

5. The system of claim 1 and including a second washer, said second washer positioned on said second section in contact with said upper end of said hub band.

6. The system of claim 1 and including an external flange said external flange positioned on said second section above said hub band.

7. The system of claim I and including a flange sleeve, said sleeve joined to said terminal flange, said sleeve for attachment within said second section.

8. A system for joining a primary sewage line of a recreational vehicle to a sewer inlet comprising: a rigid L-shaped pipe, said L-shaped pipe having first and second sections, said first section for releasable attachment to said primary sewage line, said second section for rotational attachment to said sewer inlet, said second section having a terminal end, an end flange, said end flange positioned on the terminal end of said second section, a first washer, said first washer having top and bottom surfaces, said first washer slidably affixed around said second section with said bottom surface contacting said end flange, said washer extending radially beyond said end flange, a resilient cylindrically shaped hub band, said cylindrically shaped hub band having an upper end and a lower end, said upper end defining a small axial opening, said lower end defining a large axial opening, said small axial opening aligned with and in fluid communication with said large axial opening, said second section positioned within said small axial opening, said first washer positioned within said large axial opening of said hub band, said hub bad extending axially beyond said terminal end of said second section for receiving said sewer inlet therewithin, means to adjustably clamp a said hub band to said rigid pipe and to said sewer inlet, said clamping means positioned around said hub band whereby said sewer inlet is receivable within said large axial opening against said bottom surface of said first washer radially outwardly from said flange to thereby seal said sewer inlet to said rigid L-shaped pipe and to allow rotation of said rigid L-shaped rigid pipe relative to said sewer inlet when said clamping means is loosely adjusted.

9. The system of claim 8 and including a biased means close said first section, said biased closing means attached to said first section.

10. The system of claim 9 wherein said biased sealing means is pivotally affixed to said first section.

11. The system of claim 8 and including a second washer, said second washer positioned on said second section in contact with said upper end of said hub band.

12. The system of claim 8 and including an external flange, said external flange positioned on said second section above said hub band.

13. The system of claim 8 and including a flange sleeve, said sleeve joined to said terminal flange, said sleeve for attachment within said second section.

14. The system of claim 8 wherein said clamping means comprises a metal band.

15. A system for joining a primary sewage line to a sewer inlet comprising; a rigid pipe, said pipe having first and second sections, said first section for releasable attachment to said primary sewage line, said second section for rotational attachment to said sewer inlet, said second section having a terminal end, an end flange, said end flange positioned on the terminal end of said second section, a cylindrically shaped hub band, said shaped hub band having an upper end and a lower end, said upper end defining a small axial opening, said lower end defining a large axial opening, said small axial opening aligned with and in fluid communication with said large opening, said end flange having a diameter greater than the diameter of said small axial opening, said second section positioned within said small axial opening with said flange positioned in said large axial opening whereby said sewer inlet is receivable within said large axial opening to thereby seal skid sewer inlet to said rigid pipe.

16. The system of claim 15 wherein said rigid pipe L-shaped.

17. The system of claim 15 and including means to adjustably clamp said hub band to said rigid pipe and said sewer inlet.

* * * * *